(12) United States Patent
Albero et al.

(10) Patent No.: US 12,333,250 B2
(45) Date of Patent: Jun. 17, 2025

(54) SYSTEM FOR MACHINE-LEARNING BASED IDENTIFICATION AND FILTERING OF ELECTRONIC NETWORK COMMUNICATION

(71) Applicant: BANK OF AMERICA CORPORATION, Charlotte, NC (US)

(72) Inventors: George Anthony Albero, Charlotte, NC (US); Maharaj Mukherjee, Poughkeepsie, NY (US); Elijah Clark, Charlotte, NC (US); Madhavi Mendu, Edison, NJ (US); Michael B. Jones, Jr., Charlotte, NC (US); Michael Ogrinz, Easton, CT (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 275 days.

(21) Appl. No.: 17/722,740

(22) Filed: Apr. 18, 2022

(65) Prior Publication Data
US 2023/0334247 A1 Oct. 19, 2023

(51) Int. Cl.
*G06F 40/289* (2020.01)
*G06F 16/31* (2019.01)
*G06F 40/40* (2020.01)

(52) U.S. Cl.
CPC .......... *G06F 40/289* (2020.01); *G06F 16/325* (2019.01); *G06F 40/40* (2020.01)

(58) Field of Classification Search
CPC ...... G06F 40/30; G06F 3/0482; G06F 40/166; G06N 3/08
See application file for complete search history.

(56) References Cited

U.S. PATENT DOCUMENTS

| | | |
|---|---|---|
| 7,966,078 B2 | 6/2011 | Hoffberg et al. |
| 8,364,136 B2 | 1/2013 | Hoffberg et al. |
| 8,370,362 B2 | 2/2013 | Szabo |
| 8,539,359 B2 | 9/2013 | Rapaport et al. |
| 8,826,155 B2 | 9/2014 | Dixon et al. |
| 9,239,951 B2 | 1/2016 | Hoffberg et al. |
| 9,614,807 B2 | 4/2017 | Spivack et al. |

(Continued)

OTHER PUBLICATIONS

Yin et al, Friend Recommendation Algorithm Based on Interest and Cognition Combined with Feedback Mechanism, IEEE, Cited portions of text (Year: 2019).*

*Primary Examiner* — Richa Sonifrank
*Assistant Examiner* — Ian Scott McLean
(74) *Attorney, Agent, or Firm* — Moore & Van Allen PLLC; Nicholas C. Russell

(57) ABSTRACT

A system is provided for machine-learning based identification and filtering of electronic network communication. In particular, the system may continuously monitor and pull electronic communications data from one or more networked computing systems in an enterprise environment. Based on the electronic communications data, the system may use machine learning algorithms to generate a database of associations between one or more users and one or more topics of interest. The system may then output one or more recommendations to one or more users for transmitting communications associated with the one or more topics of interest. In this way, the system may improve the efficiency of communications received and transmitted within a network.

20 Claims, 2 Drawing Sheets

(56) References Cited

U.S. PATENT DOCUMENTS

| | | | |
|---|---|---|---|
| 9,646,109 B2 | 5/2017 | Gross | |
| 9,813,435 B2 | 11/2017 | Muddu et al. | |
| 10,303,999 B2 | 5/2019 | Hertz et al. | |
| 10,459,827 B1 | 10/2019 | Aghdaie et al. | |
| 10,504,020 B2 | 12/2019 | Trenholm et al. | |
| 10,506,089 B2 | 12/2019 | Crowell et al. | |
| 10,510,000 B1 | 12/2019 | Commons | |
| 10,693,900 B2 | 6/2020 | Zadeh et al. | |
| 10,826,866 B2 | 11/2020 | Kramer et al. | |
| 10,834,249 B2 | 11/2020 | Nicholls et al. | |
| 11,019,088 B2 | 5/2021 | Pratt et al. | |
| 11,044,267 B2 | 6/2021 | Jakobsson et al. | |
| 11,082,869 B2 | 8/2021 | Carbajal et al. | |
| 11,126,923 B2 * | 9/2021 | York | G06F 16/322 |
| 11,222,052 B2 | 1/2022 | Hertz et al. | |
| 2020/0133254 A1 | 4/2020 | Cella et al. | |
| 2020/0304528 A1 | 9/2020 | Ackerman et al. | |
| 2020/0311120 A1 * | 10/2020 | Zhao | G06F 18/23 |
| 2020/0387697 A1 | 12/2020 | Chandler et al. | |
| 2021/0342785 A1 * | 11/2021 | Mann | G06F 40/186 |
| 2022/0164035 A1 | 5/2022 | Katz | |
| 2023/0139783 A1 * | 5/2023 | Garib | G06N 3/044 707/769 |

* cited by examiner

SYSTEM FOR MACHINE-LEARNING BASED IDENTIFICATION AND FILTERING OF ELECTRONIC NETWORK COMMUNICATION

FIELD OF THE INVENTION

The present disclosure embraces a system for machine-learning based identification and filtering of electronic network communication.

BACKGROUND

There is a need for an efficient and expedient way to manage communications sent over a network.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for machine-learning based identification and filtering of electronic network communication. In particular, the system may continuously monitor and pull electronic communications data from one or more networked computing systems in an enterprise environment. Based on the electronic communications data, the system may use machine learning algorithms to generate a database of associations between one or more users and one or more topics of interest. The system may then output one or more recommendations to one or more users for transmitting communications associated with the one or more topics of interest. In this way, the system may improve the efficiency of communications received and transmitted within a network.

Accordingly, embodiments of the present disclosure provide a system for machine-learning based identification and filtering of electronic network communication, the system comprising a memory device with computer-readable program code stored thereon; a communication device; and a processing device operatively coupled to the memory device and the communication device, wherein the processing device is configured to execute the computer-readable program code to continuously track electronic communications data within a network environment; generate, using a machine learning process, one or more concept identifiers from the electronic communications data; generate one or more links between one or more users and the one or more concept identifiers; store the one or more links within an associations database; and based on the associations database, generate one or more recommended recipients for a first instance of electronic communication.

In some embodiments, generating the one or more concept identifiers comprises analyzing and parsing the electronic communications data using a natural language processing algorithm; identify one or more key words or key phrases from the electronic communications data; and associating each of the one or more key words or key phrases with the one or more concept identifiers.

In some embodiments, the one or more concept identifiers are stored as hash values.

In some embodiments, generating the one or more links between the one or more users comprises computing a weight value for each of the one or more links, wherein computing the weight value is based on historical user activity associated with the one or more users and an identity or role of the one or more users.

In some embodiments, the historical user activity comprises previous electronic communications sent or received by the one or more users and browsing history of the one or more users.

In some embodiments, generating the one or more recommended recipients comprises analyzing the first instance of electronic communication using a natural language processing algorithm; detecting that a content of the electronic communication is associated with the one or more concept identifiers; and detecting that a weight value associated with the one or more links exceeds a predetermined threshold.

In some embodiments, generating the one or more recommended recipients comprises automatically populating a recipient field within a user application on a user computing system associated with the first instance of electronic communication.

Embodiments of the present disclosure also provide a computer program product for machine-learning based identification and filtering of electronic network communication, the computer program product comprising at least one non-transitory computer readable medium having computer-readable program code portions embodied therein, the computer-readable program code portions comprising executable portions for continuously tracking electronic communications data within a network environment; generating, using a machine learning process, one or more concept identifiers from the electronic communications data; generating one or more links between one or more users and the one or more concept identifiers; storing the one or more links within an associations database; and based on the associations database, generating one or more recommended recipients for a first instance of electronic communication.

In some embodiments, generating the one or more concept identifiers comprises analyzing and parsing the electronic communications data using a natural language processing algorithm; identify one or more key words or key phrases from the electronic communications data; and associating each of the one or more key words or key phrases with the one or more concept identifiers.

In some embodiments, the one or more concept identifiers are stored as hash values.

In some embodiments, generating the one or more links between the one or more users comprises computing a weight value for each of the one or more links, wherein computing the weight value is based on historical user activity associated with the one or more users and an identity or role of the one or more users.

In some embodiments, the historical user activity comprises previous electronic communications sent or received by the one or more users and browsing history of the one or more users.

In some embodiments, generating the one or more recommended recipients comprises analyzing the first instance of electronic communication using a natural language processing algorithm; detecting that a content of the electronic communication is associated with the one or more concept identifiers; and detecting that a weight value associated with the one or more links exceeds a predetermined threshold.

Embodiments of the present disclosure also provide a computer-implemented method for machine-learning based identification and filtering of electronic network communication, the computer-implemented method comprising continuously tracking electronic communications data within a network environment; generating, using a machine learning process, one or more concept identifiers from the electronic communications data; generating one or more links between one or more users and the one or more concept identifiers; storing the one or more links within an associations database; and based on the associations database, generating one or more recommended recipients for a first instance of electronic communication.

In some embodiments, generating the one or more concept identifiers comprises analyzing and parsing the electronic communications data using a natural language processing algorithm; identify one or more key words or key phrases from the electronic communications data; and associating each of the one or more key words or key phrases with the one or more concept identifiers.

In some embodiments, the one or more concept identifiers are stored as hash values.

In some embodiments, generating the one or more links between the one or more users comprises computing a weight value for each of the one or more links, wherein computing the weight value is based on historical user activity associated with the one or more users and an identity or role of the one or more users.

In some embodiments, the historical user activity comprises previous electronic communications sent or received by the one or more users and browsing history of the one or more users.

In some embodiments, generating the one or more recommended recipients comprises analyzing the first instance of electronic communication using a natural language processing algorithm; detecting that a content of the electronic communication is associated with the one or more concept identifiers; and detecting that a weight value associated with the one or more links exceeds a predetermined threshold.

In some embodiments, generating the one or more recommended recipients comprises automatically populating a recipient field within a user application on a user computing system associated with the first instance of electronic communication.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
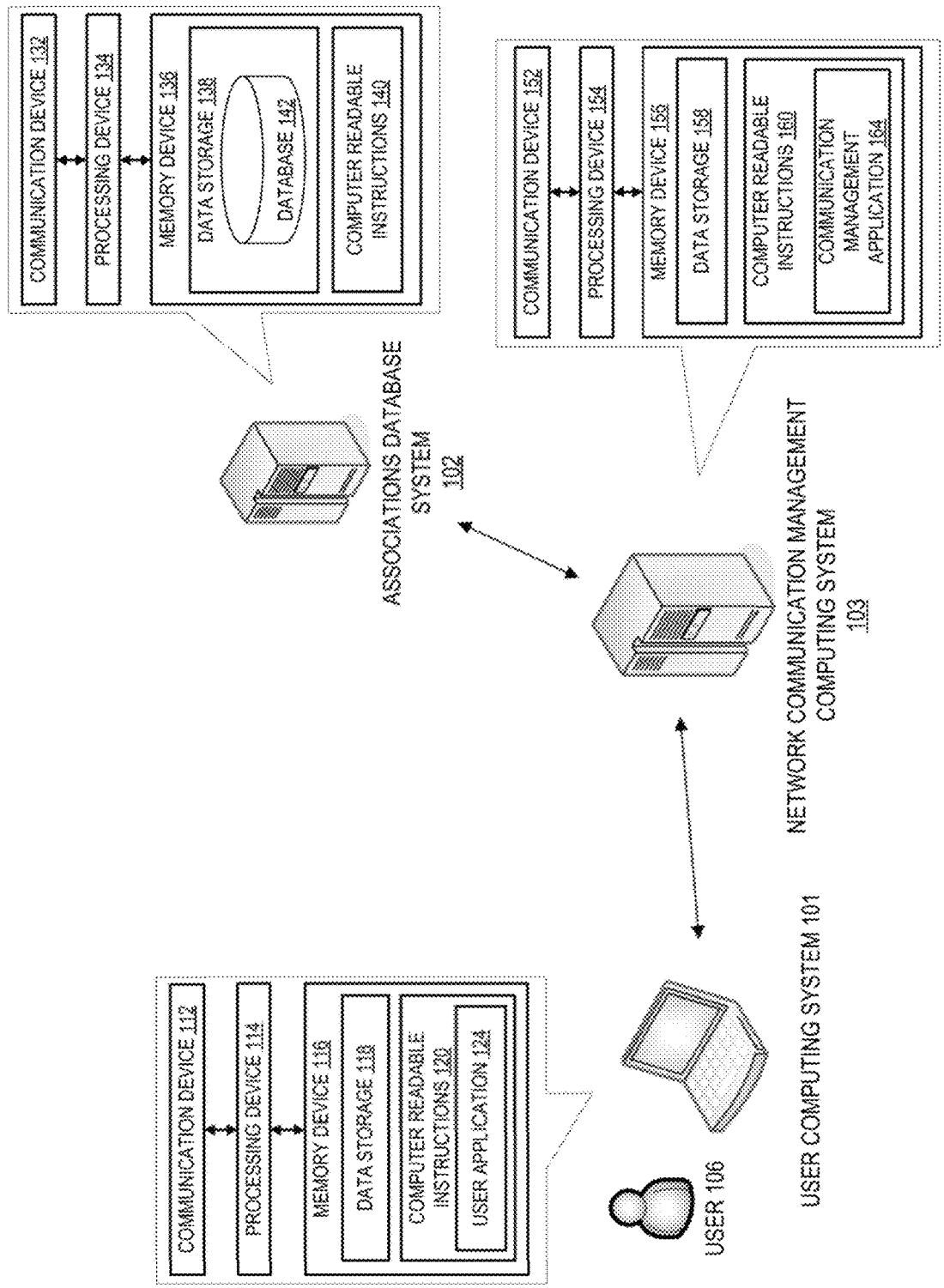
Figure 2:
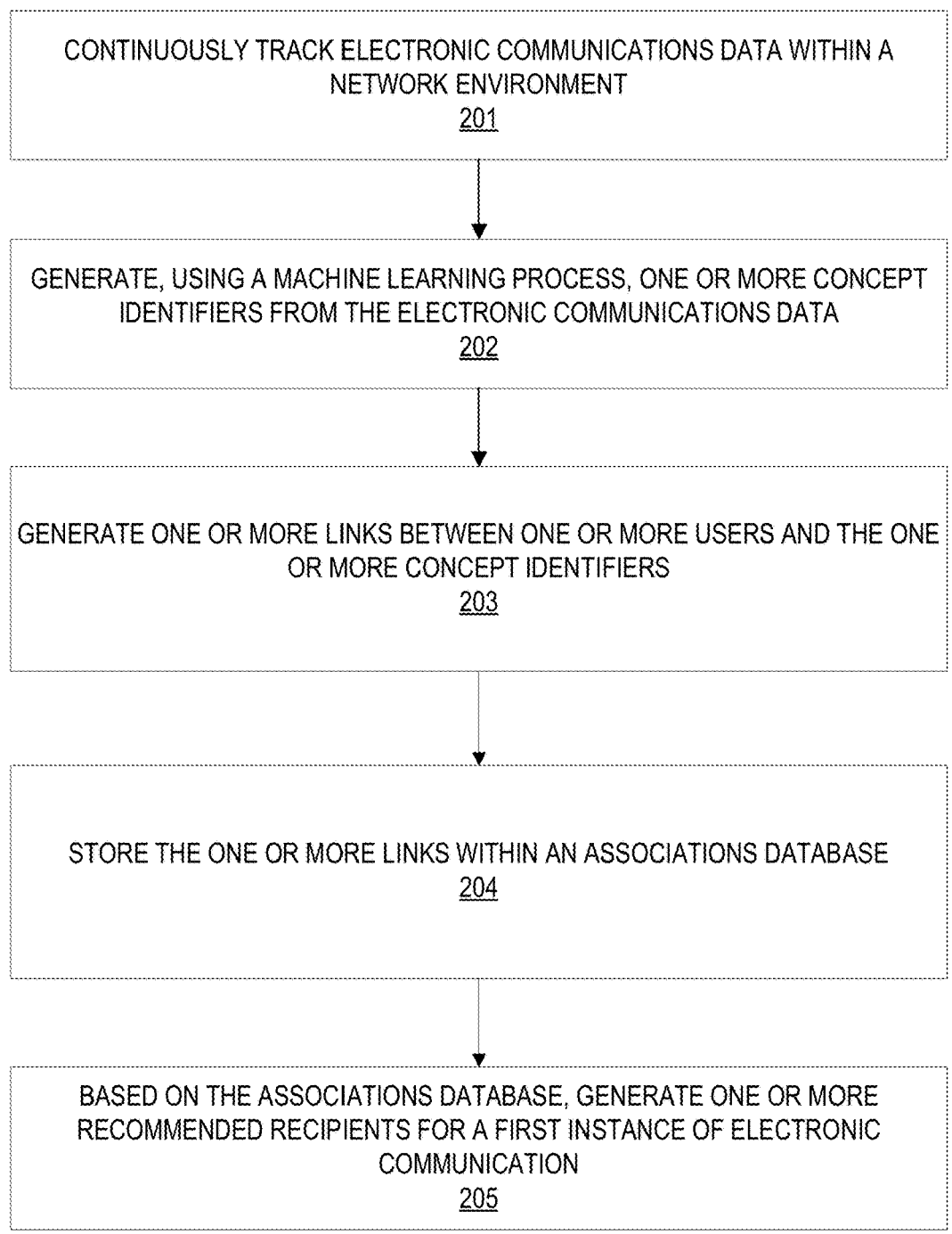

Having thus described embodiments of the invention in general terms, reference will now be made to the accompanying drawings, wherein:

FIG. 1 illustrates an operating environment for the network communication management system, in accordance with one embodiment of the present disclosure;

FIG. 2 is a flow diagram illustrating a process for machine-learning based identification and filtering of electronic network communication, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, "user" as used herein may refer to a computerized resource (e.g., a computing system, application, system process, or the like) that may access other resources as part of its operations.

Accordingly, as used herein the term "user device" or "mobile device" may refer to mobile phones, personal computing devices, tablet computers, wearable devices, and/or any portable electronic device capable of receiving and/or storing data therein.

"Resource" as used herein may refer to tangible or intangible objects which may be held, owned, or used by a user and/or the entity. In particular, "resource" as used herein may refer to computing resources such as hardware (e.g., computing systems, hardware components, servers, wireless smart devices, IoT devices, or the like) and/or software (e.g., applications, operating systems, data repositories, or the like).

"Natural language processing" or "NLP" as used herein may refer to artificial intelligence technology that may allow computing devices to process and analyze language data. "Natural language understanding" or "NLU" as used herein may refer to the process by which a computing device (e.g., a device with NLP functionality) understands or comprehends natural language.

Large quantities of electronic communications data may be transmitted between computing systems within an enterprise network environment. Examples of such electronic communications data may include e-mails, web site data, electronic articles, and the like, which may be sent to one or more users within the network. That said, it may be desirable to intelligently filter the transmission and/or receipt of the electronic communications data to be targeted to a particular user and/or set of users according to the topic associated with the electronic communications data.

To address the scenarios described above among others, the present disclosure provides a system for machine-learning based identification and filtering of electronic network communication. In this regard, the system may continuously monitor and track electronic communications transmitted within the network (e.g., e-mails, direct/instant messages, accessing of documents and/or web pages, or the like). The system may use machine learning algorithms (e.g., NLP-based algorithms) to parse the electronic communications and extract key words, concepts, or topics associated with each communication. For instance, the topics or concepts may include extracted words or phrases, such as "code development," "web applications," or "application security."

The machine learning algorithms may further generate links or associations between the key topics and one or more users associated with said key topics, where such associations may be stored within an associations database. Each topic may be assigned a "topic identifier" or "concept identifier," which may be an alphanumeric value (e.g., a hash value) which uniquely identifies a particular topic or concept. In this regard, the associations may be generated based at least in part on current and/or historical data associated with the electronic communications and/or the users, such as past user actions (e.g., subscribing to topics of interest, sending or receiving e-mails associated with a topic, viewing articles or other writings associated with a topic, or the like), the nature of the electronic communications associated with the user (e.g., an e-mail is addressed specifically to the user, attached documents or file referencing or being associated with the user), user metadata (e.g., a status or title assigned to the user), or the like. In some embodiments, the associations may be assigned weight values by the machine learning algorithms, where the weight values indicate the strength of the association between a user and a particular topic. Accordingly, relatively higher weight values may indicate a greater association (e.g., a greater interest) of the user to a particular topic, whereas lower weight values may indicate a lower association (e.g., a lower interest). In some embodiments, weight values may be increased based on the frequency at which a user is associated by the system with a particular topic (e.g., if the user frequently sends and receives correspondence regarding a particular topic). Furthermore, weight values may be increased by greater amounts depending on the nature of the interactions of the user with the topic (e.g., the weight value may be increased by a relatively greater amount if the user deliberately subscribes to a topic as opposed to if the user passively receives a communication regarding the topic).

Using the generated associations within the associations database, the system may generate one or more recommendations for recipient users based on the content of a particular electronic communication and transmit the recommendations to a user computing system. For instance, a first user may compile a draft e-mail to be sent to one or more users within the network environment. In such cases, the system may use the machine learning algorithms to identify one or more topics from the draft e-mail. Based on the identified topics within the draft e-mail, the system may retrieve the associations from the associations database to identify one or more users who are associated with the one or more topics. Once the one or more users have been identified, the system may recommend the one or more users to be recipients of the draft e-mail. In this regard, the system may automatically populate the recipient field of a user's e-mail client with the recommended recipients of the draft e-mail. In other embodiments, the system may generate recommendations for transmitting articles, documents, or other electronic communications based on the identified topics within such communications and the associations within the associations database. For instance, the system may recommend, based on a title associated with an agent or employee of the entity (e.g., developer), that one or more articles (e.g., articles related to code development) are sent to the agent or employee. In other embodiments, the recipient may be a customer of the entity who may be interested in certain products or services provided by the entity.

In some embodiments, the system may display a graphical user interface with various interface elements for viewing and interacting with the recommendations generated by the system. For instance, the graphical interface may, upon receiving input from the user (e.g., by the user hovering a mouse cursor over a recommended recipient), display one or more reasons for suggesting a particular recipient (e.g., suggested based on subscription, browsing history, title, or the like). The system may further provide a way for a user to provide manual inputs into the machine learning algorithm. For instance, upon viewing one or more recommended recipients for an electronic communication, the user may remove or deselect a recipient from the list of recommended recipients and provide input into the reasons for deselecting such a recipient (e.g., recipient has requested to be removed from e-mail chain, recipient is no longer associated with the project or role, or the like). The machine learning algorithm may then use the manual inputs to further refine its recommendation engine.

In some embodiments, the system may further use the machine learning algorithm to provide recommendations and/or perform processes on behalf of the recipient. For instance, the machine learning algorithm may be used to determine which topics are not relevant to a particular recipient (e.g., a recipient has been determined not to be interested in a particular topic). Based on such a determination, the system may automatically perform filtering of electronic communications on behalf of the recipient, which may include automatically unsubscribing from non-relevant e-mails or other electronic communications, topic-based blocking communications, automatic replies requesting removal and stating the reason for the request (e.g., "Please remove from list—no longer in role").

An exemplary use case of the system as described herein is provided below. It should be understood that said use case is provided for illustrative purposes only and is not intended to reduce or limit the scope of the disclosure. In one embodiment, a recipient may be a developer who has been assigned to an application development project with the entity. In this regard, the recipient may regularly access electronic articles or documents which may be associated with certain topics related to development (e.g., C++, Java, API's, libraries, and the like). The system may use machine learning processes (e.g., NLP) to parse the electronic articles and/or documents and identify the topics related to such articles and/or documents. Accordingly, based on the recipient accessing such articles, the system may generate one or more associations between the recipient and the identified topics and subsequently store such associations within an associations database.

The system may further generate associations between the recipient and the topics based on the recipient's job title (e.g., developer), involvement in the project (e.g., a code development project), and the history of correspondence between the recipient and other users regarding the topics (e.g., e-mails regarding a bug affecting an API associated with the application in development). In addition, the system may generate associations between the recipient and the topics based on detecting that the recipient has received and transmitted multiple instances of correspondence (e.g., e-mails) regarding the topics.

Subsequently, a user (e.g., a sender) may begin drafting an e-mail regarding the application development project. The system may identify, using the machine learning algorithms, one or more topics from the content of the draft e-mail (e.g., the subject line, the e-mail body, manually inputted recipients, and the like). Based on the identified topics within the draft e-mail, the system may detect one or more matches between the identified topics and the recipient based on the recipient's associations as found in the associations database. Subsequently, the system may automatically trigger the addition of the recipient to the recipient line of the e-mail client installed on the user's computing system. If the user hovers over the recipient's name within the recipient line, the system may cause the graphical interface of the user computing system to display one or more factors for recommending the recipient (e.g., recipient's job title, involvement with the application development project, historical correspondence data, and the like). In this way, the system provides an efficient topic-centric way to identify recipients of interest for electronic communications.

The system as described herein confers a number of technological advantages over conventional electronic communication management systems. For instance, by intelligently identifying and selecting electronic communications to be sent to specific interested recipients, the system reduces the incidence of electronic communications unnecessarily sent to uninterested parties, which in turn saves a significant amount of precious computing resources (e.g., processing power, data storage space, network bandwidth, and the like) within the enterprise network environment. Furthermore, by using machine learning processes, the system may improve its efficiency and accuracy over time, which further saves computing resources over time.

Turning now to the figures, FIG. 1 illustrates an operating environment 100 for the network communication management system, in accordance with one embodiment of the present disclosure. In particular, FIG. 1 illustrates a network communication management computing system 103 in operative communication with a user computing system 101 and associations database system 102 over a network. In such a configuration, the network communication management computing system 103 may transmit data to and receive data from computing systems over the network, including the user computing system 101 and/or the associations database system 102.

It should be understood that FIG. 1 illustrates only an exemplary embodiment of the operating environment 100, and it will be appreciated that the operating environment 100 may comprise fewer or greater numbers of computing systems than what is depicted in FIG. 1. For example, though FIG. 1 depicts a single associations database system 102, the operating environment may comprise multiple networked databases that may be used to store associations data. It should also be appreciated that one or more functions of the systems, devices, or servers as depicted in FIG. 1 may be combined into a single system, device, or server and/or performed by other computing systems. For instance, though the network communication management computing system 103 and the associations database system 102 are depicted as separate systems, the functions of both systems may in some embodiments be combined into a single computing system. Furthermore, the functions of a single system, device, or server as depicted in FIG. 1 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the network communication management computing system 103 may be a computing system that performs the monitoring, tracking, and analysis of network communications of the computing systems within the network environment (e.g., the user computing system 101). Accordingly, the network communication management computing system 103 may comprise a processing device 154 operatively coupled to a communication device 152 and a memory device 156. The memory device 156 may comprise data storage 158 and computer readable instructions 160 stored thereon, where the computer readable instructions 160 may comprise a communication management application 164. The communication management application 164 may, when executed by the processor 154 of the network communication management computing system 103, cause the processor 154 to perform, using machine learning processes, the monitoring and tracking of network communications, parsing and identification of topics, generation of associations between users and topics, and generation of recommendations as described elsewhere herein.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

As further illustrated in FIG. 1, the user computing system 101 may be in operative communication with the associations database system 102 and/or the network communication management computing system 103. The user computing system 101 may be a computing system owned and/or operated by a user 106, where the user may be an individual who is associated with the entity (e.g., an authorized user on the entity's network such as an agent, employee, or customer of the entity). That said, it is within the scope of the disclosure for the user 106 to be a nonhuman user (e.g., an application).

The user 106 may, using the user computing system 101, receive and/or transmit various types of network communications with the various computing systems in the network environment. Accordingly, the user computing system 101 may comprise a communication device 112, a processing device 114, and a memory device 116. In some embodiments, the user computing system 101 may comprise hardware and/or software components that allow the user computing system 101 to interface with the user 106. In such embodiments, the user computing system 101 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The memory device 116 of the user computing system 101 may further comprise data storage 118 and computer-readable instructions 120 stored thereon. The data storage 118 may have a data artifact 122 stored thereon, where the data artifact 122 may be an artifact that the user 106 has selected for validation and/or evaluation. The computer-readable instructions 120 may comprise a user application 124. The user application 124 may be a software application that the user 106 may use to access, view, and/or transmit electronic communications, such as e-mails, web pages, document files, and the like.

As further illustrated in FIG. 1, the associations database system 102 may be a computing system that stores the various associations generated by the network communication management computing system 103. Accordingly, the associations database system 102 may comprise a communication device 132, a processing device 134, and a memory device 136, where the processing device 134 is operatively coupled to the communication device 132 and the memory device 136. The processing device 134 uses the communication device 132 to communicate with the network and other devices on the network. As such, the communication device 132 generally comprises a modem, antennae, Wi-Fi or Ethernet adapter, radio transceiver, or other device for communicating with other devices on the network.

The memory device 136 comprises computer-readable instructions 140 and data storage 138. The data storage 138 of the associations database system 102 may comprise a database 142, where the database 142 is an associations database containing one or more associations between one or more users and one or more topics as identified through the machine learning-based processes of the network communication management computing system 103.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic, or other systems that perform various functions of the computing systems. These systems may comprise, for example, electrical circuits, motors, compressors, or any system that enables functioning of the computing systems.

FIG. 2 is a flow diagram illustrating a process flow 200 for machine-learning based identification and filtering of electronic network communication, in accordance with one embodiment of the present disclosure. The process begins at block 201, where the system continuously tracks electronic communications data within a network environment. In this regard, the system may monitor the various computing systems within the network for electronics communications sent between the various computing systems, where the electronic communications may include e-mails, electronic documents or files, web pages, instant or direct messages, or the like. In this regard, the system may monitor and read the electronic communications themselves along with metadata associated with the electronic communications, such as the time of transmission and/or receipt, the identities of the senders and recipients, applications used to generate and/or view the electronic communications, and the like. Based on the data and the metadata associated with the electronic communications, the system may perform intelligent filtering of electronic network communications with respect to the users within the network, as described herein.

The process continues to block 202, where the system generates, using a machine learning process, one or more concept identifiers from the electronic communications data. In this regard, the machine learning process may include using an NLP-based algorithm to parse and analyze the electronic communications data to identify key terms within the electronic communications data. For instance, the NLP algorithm may detect the terms "browser update" and "security" in an e-mail sent from a first user (e.g., a systems administrator) to a second user (e.g., an application developer). Based on detecting the key terms, the system may generate concept identifiers with each of the key terms. In some embodiments, the concept identifier may be an alphanumeric value or string, such as a hash output of a cryptographic hash algorithm (e.g., Secure Hash Algorithm, MD5, or the like) that may be generated by inputting the key term into the cryptographic hash algorithm. Once the concept identifiers are generated, the system may store the concept identifiers within an associations database.

The process continues to block 203, where the system generates one or more links between one or more users and the one or more concept identifiers. In this regard, the system may store, within the associations database, information regarding the one or more users within the network environment, such as user identifiers, titles or roles within the entity, involvement of the user in entity-specific projects, and the like. In some embodiments, the one or more users may include agents, administrators, and/or employees of the entity who may send and receive electronic communications to and from one another. In other embodiments, the one or more users may include customers of the entity who may access resources provided by the entity (e.g., web pages), and/or send and receive electronic communications to and from the entity. The system may further store historical data associated with the users, where the historical data may include user actions or activity associated with each user computing system (e.g., electronic messages or e-mails sent or received, documents or web pages accessed, search history, subscriptions, or the like).

Based on the historical data associated with a particular user, the system may associate the user with one or more concept identifiers. For example, the system may detect that the user has previously sent and received e-mails regarding a particular concept (e.g., network security) and subsequently associate the user with the concept identifier associated with network security. In some embodiments, the machine learning algorithm may compute a weight of the association based on the various other factors associated with the user. For instance, the system may detect that the user has the title of "network administrator," and that the user has accessed one or more web sites or articles containing the concept "network security." The system may further detect that the user is involved an entity-specific project that is associated with the concept of network security (e.g., a project to apply security updates to computing systems in the network). Based on such factors, the system may incrementally increase the weight values of the association value between the user and the concept. In some embodiments, the weight values may be further refined based on the nature of the communications involving the user on the selected concept (e.g., frequency of correspondence regarding the concept, the length or depth of the communications sent by the user, and the like). In this regard, the system may use the NLP based algorithm to analyze the communications sent and/or received by the user detect a level of interaction of the user with the identified concept. For instance, the system may increase the weight value by a relatively higher amount if the user sends frequent, detailed e-mails regarding the concept, and by a relatively lower amount if the user infrequently sends e-mail regarding the concept.

In some embodiments, the machine learning algorithm may further alter the weight of the association based on the user's direct actions with respect to the concept. For instance, the user interface of the user computing system may allow the user to provide an input regarding the relevance of a particular topic or concept to the user. In this regard, the system may receive a subscription request from the user (e.g., through the graphical interface displayed on the user computing system) with respect to a particular concept identifier (e.g., a user may sign up to receive e-mails regarding data security policies). In response to the subscription request, the system may increase the weight value of the association between the user and the concept identifier associated with the subscription request.

The process continues to block 204, where the system stores the one or more links within an associations database. The links may be stored in the associations database along with the data and metadata associated with the user and the concept identifiers. The system may continuously update the weight values associated with the one or more links by executing the machine learning processes to analyze the electronic communications sent throughout the network. In this way, the system may produce increasingly accurate recommendations over time.

The process concludes at block 205, where the system, based on the associations database, generates one or more recommended recipients for a first instance of electronic communication. In this regard, the system may detect the first instance of electronic communication within a user computing system (e.g., an e-mail being drafted by the user). Based on analyzing the contents of the e-mail (e.g., the subject line, e-mail body, and the like) using the machine learning algorithm, the system may determine that the e-mail is associated with one or more concept identifiers. Based on the concept identifiers within the first instance of electronic communication, the system may identify, using the links stored in the associations database, one or more users associated with the concept identifiers within the first instance of electronic communication. In some embodiments, the system may determine whether the associations between the concept identifiers within the first instance of electronic communication and the one or more users exceeds a predefined threshold. If the weight values exceed the threshold, the system may recommend the users to be recipients of the first instance of electronic communication. In some embodiments, the system may automatically execute certain actions based on identifying the recommended recipients. For example, the system may automatically populate the recipient fields of the user application (e.g., an e-mail client) based on detecting that the links between such recipients and the concepts identified in the first instance of electronic communication exceeds the designated threshold. On the other hand, if the weight values do not exceed the threshold, the system may prevent such users from being automatically recommended as recipients.

In some embodiments, the system may further be configured to display information about the recommended recipients. For instance, the system may cause the user computing system to, in response to the user input (e.g., hovering over the name of the recommended recipient using a mouse cursor), display information such as the identities of the recipients, the roles or titles associated with the recipients, and/or the basis for recommending the recipients. In some embodiments, the user input may be a deselection of a recommended recipient. In this regard, the system may further receive feedback into why the recommended recipient was deselected (e.g., no longer in role, no longer associated with the project, etc.) through one or more interface elements displayed to the user (e.g., radio buttons, check boxes, text entry fields, and the like). In this way, the system provides an efficient way to manage and filter electronic communications transmitted within the network environment.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for machine-learning based identification and filtering of electronic network communication, the system comprising:
   a memory device with computer-readable program code stored thereon;
   a communication device; and
   a processing device operatively coupled to the memory device and the communication device, wherein the processing device is configured to execute the computer-readable program code to:
      continuously track electronic communications data within a network environment;
      generate, using a machine learning process, one or more concept identifiers from the electronic communications data;
      generate one or more links between one or more users and the one or more concept identifiers, wherein the one or more links comprise network security and programming languages;

detect interaction levels between the one or more users and the one or more concept identifiers using a natural language processing algorithm;

store the one or more links within an associations database;

based on the associations database, generate one or more recommended recipients for a first instance of electronic communication;

present the one or more recommended recipients to a user on a user computing device;

detect that the user has deselected at least one recipient from the one or more recommended recipients;

receive a user input comprising a reason for deselecting the at least one recipient, wherein the reason comprises a removal request by the at least one recipient;

based on detecting that the user has deselected the at least one recipient and the user input, refine a machine learning algorithm associated with the machine learning process; and execute, using the machine learning algorithm, a filtering of the electronic communications on behalf of the at least one recipient, wherein the filtering comprises automatically unsubscribing from other electronic communications and blocking the electronic communications based on a topic.

2. The system according to claim 1, wherein generating the one or more concept identifiers comprises:

analyzing and parsing the electronic communications data using the natural language processing algorithm;

identify one or more key words or key phrases from the electronic communications data; and associating each of the one or more key words or key phrases with the one or more concept identifiers.

3. The system according to claim 2, wherein the one or more concept identifiers are stored as hash values.

4. The system according to claim 1, wherein generating the one or more links between the one or more users comprises computing a weight value for each of the one or more links, wherein computing the weight value is based on historical user activity associated with the one or more users and an identity or role of the one or more users.

5. The system according to claim 4, wherein the historical user activity comprises previous electronic communications sent or received by the one or more users and browsing history of the one or more users.

6. The system according to claim 1, wherein generating the one or more recommended recipients comprises:

analyzing the first instance of electronic communication using the natural language processing algorithm;

detecting that a content of the electronic communication is associated with the one or more concept identifiers; and detecting that a weight value associated with the one or more links exceeds a predetermined threshold.

7. The system according to claim 1, wherein generating the one or more recommended recipients comprises automatically populating a recipient field within a user application on a user computing system associated with the first instance of electronic communication.

8. A computer program product for machine-learning based identification and filtering of electronic network communication, the computer program product comprising at least one non-transitory computer readable medium having computer-readable program code portions embodied therein, the computer-readable program code portions comprising executable portions for:

continuously tracking electronic communications data within a network environment;

generating, using a machine learning process, one or more concept identifiers from the electronic communications data;

generating one or more links between one or more users and the one or more concept identifiers, wherein the one or more links comprise network security and programming languages;

detecting interaction levels between the one or more users and the one or more concept identifiers using a natural language processing algorithm;

storing the one or more links within an associations database;

based on the associations database, generating one or more recommended recipients for a first instance of electronic communication;

presenting the one or more recommended recipients to a user on a user computing device;

detecting that the user has deselected at least one recipient from the one or more recommended recipients;

receiving a user input comprising a reason for deselecting the at least one recipient, wherein the reason comprises a removal request by the at least one recipient;

based on detecting that the user has deselected the at least one recipient and the user input, refining a machine learning algorithm associated with the machine learning process; and executing, using the machine learning algorithm, a filtering of the electronic communications on behalf of the at least one recipient, wherein the filtering comprises automatically unsubscribing from other electronic communications and blocking the electronic communications based on a topic.

9. The computer program product of claim 8, wherein generating the one or more concept identifiers comprises:

analyzing and parsing the electronic communications data using the natural language processing algorithm;

identify one or more key words or key phrases from the electronic communications data; and associating each of the one or more key words or key phrases with the one or more concept identifiers.

10. The computer program product of claim 9, wherein the one or more concept identifiers are stored as hash values.

11. The computer program product of claim 8, wherein generating the one or more links between the one or more users comprises computing a weight value for each of the one or more links, wherein computing the weight value is based on historical user activity associated with the one or more users and an identity or role of the one or more users.

12. The computer program product of claim 11, wherein the historical user activity comprises previous electronic communications sent or received by the one or more users and browsing history of the one or more users.

13. The computer program product of claim 8, wherein generating the one or more recommended recipients comprises:

analyzing the first instance of electronic communication using the natural language processing algorithm;

detecting that a content of the electronic communication is associated with the one or more concept identifiers; and detecting that a weight value associated with the one or more links exceeds a predetermined threshold.

14. A computer-implemented method for machine-learning based identification and filtering of electronic network communication, the computer-implemented method comprising:
- continuously tracking electronic communications data within a network environment;
- generating, using a machine learning process, one or more concept identifiers from the electronic communications data;
- generating one or more links between one or more users and the one or more concept identifiers, wherein the one or more links comprise network security and programming languages;
- detecting interaction levels between the one or more users and the one or more concept identifiers using a natural language processing algorithm;
- storing the one or more links within an associations database;
- based on the associations database, generating one or more recommended recipients for a first instance of electronic communication;
- presenting the one or more recommended recipients to a user on a user computing device;
- detecting that the user has deselected at least one recipient from the one or more recommended recipients;
- receiving a user input comprising a reason for deselecting the at least one recipient, wherein the reason comprises a removal request by the at least one recipient;
- based on detecting that the user has deselected the at least one recipient and the user input, refining a machine learning algorithm associated with the machine learning process; and
- executing, using the machine learning algorithm, a filtering of the electronic communications on behalf of the at least one recipient, wherein the filtering comprises automatically unsubscribing from other electronic communications and blocking the electronic communications based on a topic.

15. The computer-implemented method of claim 14, wherein generating the one or more concept identifiers comprises:
- analyzing and parsing the electronic communications data using the natural language processing algorithm;
- identify one or more key words or key phrases from the electronic communications data; and
- associating each of the one or more key words or key phrases with the one or more concept identifiers.

16. The computer-implemented method of claim 15, wherein the one or more concept identifiers are stored as hash values.

17. The computer-implemented method of claim 14, wherein generating the one or more links between the one or more users comprises computing a weight value for each of the one or more links, wherein computing the weight value is based on historical user activity associated with the one or more users and an identity or role of the one or more users.

18. The computer-implemented method of claim 17, wherein the historical user activity comprises previous electronic communications sent or received by the one or more users and browsing history of the one or more users.

19. The computer-implemented method of claim 14, wherein generating the one or more recommended recipients comprises:
- analyzing the first instance of electronic communication using the natural language processing algorithm;
- detecting that a content of the electronic communication is associated with the one or more concept identifiers; and
- detecting that a weight value associated with the one or more links exceeds a predetermined threshold.

20. The computer-implemented method of claim 14, wherein generating the one or more recommended recipients comprises automatically populating a recipient field within a user application on a user computing system associated with the first instance of electronic communication.

* * * * *